April 25, 1944.   L. G. LINDSAY   2,347,204
MULTIPLE PORT VALVE
Filed May 29, 1942
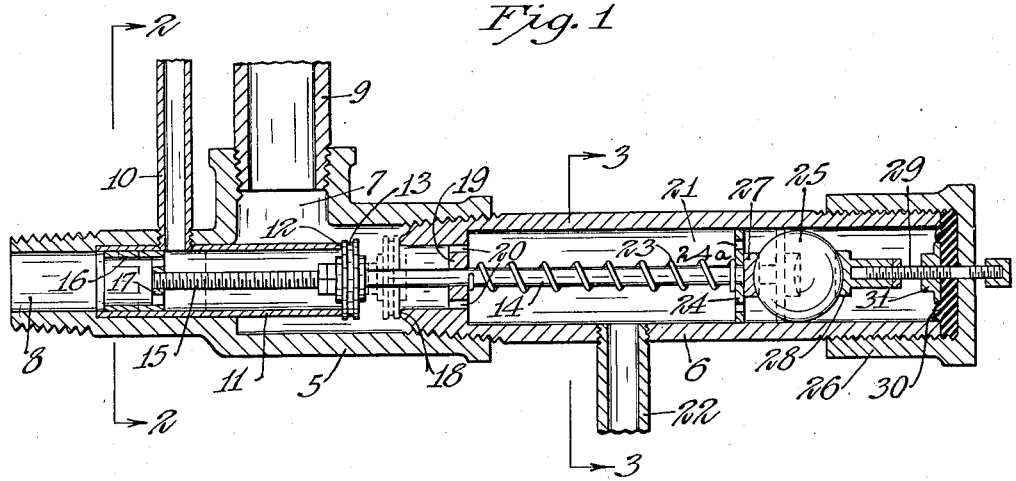
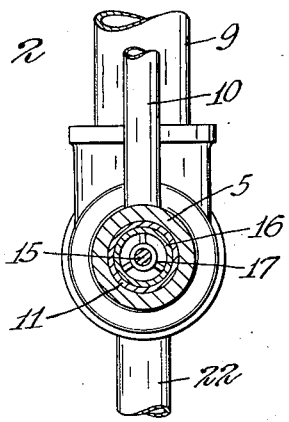
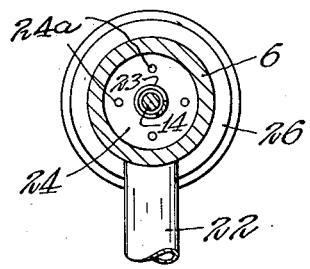
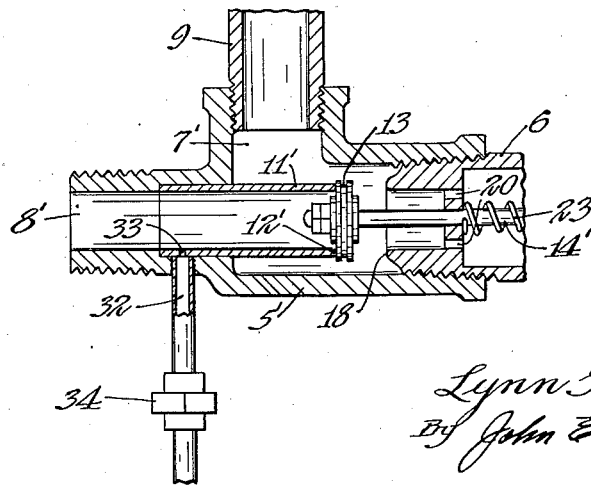
Inventor
Lynn G. Lindsay
By John E. Stryker Jr.
Attorney Patented Apr. 25, 1944

2,347,204

UNITED STATES PATENT OFFICE 2,347,204

MULTIPLE PORT VALVE

Lynn G. Lindsay, Chicago, Ill.

Application May 29, 1942, Serial No. 444,943

8 Claims. (Cl. 137—144)

This invention relates to a valve of the type wherein a solid body which is soluble in the liquid flowing through the valve is used to retain a valve member in a closed position for a predetermined period of time and means are provided to actuate the valve member to another position automatically.

The principal object of the present invention is to insure positive operation of a valve of this kind by providing novel and efficient means for balancing the pressure on the valve surfaces.

A particular object is to provide for a valve of this class pressure balancing means comprising independent supplies of liquid communicating with opposite faces of a valve closure member, at least one of these supplies being under control of automatic valve operating mechanism.

A further object is to provide a novel, semiautomatic control valve for water softening apparatus of the type requiring periodic regeneration of the softening material or bed.

The invention will be best understood by reference to the accompanying drawing in which:

Figure 1 is a longitudinal section through one form of my improved valve which is particularly although not exclusively adapted for use in the control of water softening apparatus;

Figs. 2 and 3 are cross sections taken on the lines 2—2 and 3—3 of Fig. 1, and

Fig. 4 is a fragmentary, longitudinal section showing a modified arrangement for balancing the pressure on the valve closure head.

As shown in Fig. 1, the casing of my valve comprises a T-shaped member 5 having a tubular extension 6 connected to one of its branches. A main inlet port 7 and an outlet port 8 are formed in the casing member 5. A pipe 9 is arranged to connect the port 7 to the soft water outlet of water softening apparatus and the port 8 may be connected to the service outlet system of a dwelling or other building. The casing 5 is drilled and tapped for connection with a pipe 10 which is arranged to by-pass the softening apparatus, being supplied with fresh hard water at a pressure approximately equal to that of the pressure in the soft water pipe 9.

Fixed in the casing 5 in alignment with the port 8 is a tube 11 formed with a seat 12 for a valve head 13 at one end and having an opening in its side communicating with the pipe 10. The head 13 is mounted on a rod 14 extending axially in the casing member 6 and also having a threaded portion 15 projecting axially within the tube 11. A cylindrical valve head 16 is fixed on an end of the portion 15 of the rod 14 and slidably fits within the tube 11 for movement to and from a closed position across the opening for pipe 10. A spider 17 connects the rod to the head 16, openings being formed in the spider to allow liquid to pass to port 8 through the cylindrical head 16.

The valve head 13 is movable from its closed position against seat 12 to a position, shown in dotted lines, where it closes against a seat 18 formed on the inner end of the casing member 6. The rod 14 is guided in an end wall 19 within the casing member 6 and this wall is formed with a series of openings 20 to allow the passage of liquid into a chamber 21. Communicating with this chamber is a pipe 22 and within the chamber a compression spring 23 is mounted on the rod 14 to urge the valve heads 13 and 16 to the right (Fig. 1). One end of this spring abuts against the wall 19 and the other end abuts against a disk 24 which is fixed on the rod 14. A series of openings 24a are formed in the disk 24 to direct liquid against a soluble body 25 adapted to be inserted in the chamber 21. Access to this chamber is afforded by providing a removable screw cap 26. The body 25 is preferably spherical and contact members 27 and 28 are provided to engage opposite peripheries of this body, the contact faces of these members being concavely spherical and adapted to fit and cover a substantial area of the body. A rod 29 extends in axial alignment with the rod 14 to connect the contact member 28 to the cap 26. Mounted with the cap 26 is a thick soft rubber cushion 30 adapted to engage and seal the end of the casing member 6 and also adapted to transmit the thrust of the cap to a collar 31 which is fixed on the rod 29. This rod is free for limited longitudinal movement in an axial bore in the cap, a nut being provided on the rod for engagement with the outer face of the cap. The spacing of the member 26 relative to the collar 31 is made adjustable by threading the rod and connected members.

When my improved valve is used to control water softening apparatus of the type which requires periodic regeneration, the pipe 9 may be connected to the soft water outlet of such apparatus, the port 8 to the service pipe, the pipe 10 is arranged to by-pass the water softener apparatus and to be supplied with hard water directly from the main and the pipe 22 is connected to the waste pipe or drain. With this arrangement, during the normal water softening operation and in the absence of the body 25 in the chamber 21, the valve head 13 is closed against its seat 18 and the head 16 is in its position where it closes communication between the pipe 10 and valve casing. Soft water flows from the pipe 9 through the tube 11 and out through the port 8 and service system. When regeneration is required, the casing cap 26 is removed and one of the soluble bodies 25 is inserted in the chamber 21 against the contact member 27. Now the cap 26 is replaced and turned onto the casing so that the cushion 30 actuates the collar 31, rod 29 and contact member 28 to thrust the body 25 against the contact member 27 and actuate the rod 14 to close the head 13 against the seat 12 and to move the cylindrical head 16 to its open, full line position (Fig. 1) relative to the pipe 10. Hard water is now supplied to the service system through the pipe 10 in substitution for the soft water supplied through the pipe 9 while the regenerating liquid, usually brine, together with impurities from the softening material and wash water are caused to flow through the water softening apparatus and to be discharged through the pipe 9, valve casing 5, openings 20, chamber 21 and pipe 22. During this part of the cycle of operation the liquid flows from the chamber 21 through the openings 24a in the disk 24 so that it reaches the soluble body 25 and gradually forms a solution therefrom, this solution escaping through the openings 24a and pipe 22.

The thick cushion 30 is preferably adapted to be compressed approximately a quarter of an inch. It not only performs the important function of transmitting thrust from the cap 26 to the body 25 when the valve head 13 is closed against the seat 12 manually thus guarding against accidental crushing of the body 25, but this cushion also compensates for the initial reduction of the body 25 under the dissolving action of the liquid passing through the valve casing, thus retaining the head 13 in sealing relation to its seat 12 until the final and sudden collapse of the soluble body 25. The contact members 27 and 28 also promote quick opening of the valve by shielding opposite faces of the body 25. When the body 25 has been reduced to the point where it collapses, the spring 23 actuates the rod 14 carrying the valve heads 13 and 16 to their dotted line positions thereby cutting off the supply of hard water to port 8 from pipe 10 and placing the soft water pipe 9 in communication with the port 8. I insure the positive operation to the dotted line position of the valve head by my arrangement for balancing the pressure on the head 13. It will be understood that the pressure per unit of area which is exerted by the hard water supplied through the by-pass pipe 10 is equal to that exerted by the supply from pipe 9 so that the total pressures on opposite surfaces of the heads 13 and 16 respectively are equalized.

Referring to the modified valve shown in Fig. 4, I provide an independent water supply pipe 32 which communicates with the casing 5' near the port 8' through a minute opening 33 in the tube 11'. To facilitate periodic cleaning of the opening 33, a union 34 may be provided in the pipe 32. With this connection, the valve head 16 and threaded portion 15 of rod 14' may be omitted and the remaining parts of the device may be constructed to operate as hereinbefore described. When the valve head 13 is closed against its seat 12', as indicated in Fig. 4, sufficient water is supplied through the minute opening 33 to balance the pressure on opposite faces of the head. It has been found that the opening 33 will function to build up the necessary back pressure even when made as small as from 15 to 20 thousandths of an inch in diameter. During the water softening operation the small amount of hard water that is passed through this opening 33 does not materially affect the relatively large volume of soft water which flows from pipe 9 to port 8' and into the service system.

Having described my invention, what I claim as new and desire to protect by Letters Patent is:

1. Valve control means comprising, a chamber, conduits for causing flow of liquid under pressure through said chamber, a valve member held in closed position by a soluble body positioned in said chamber, said soluble body being exposed to liquid in said casing, means for actuating said valve member to open position, an outlet disposed to receive liquid when said member is in open position and a conduit disposed to supply liquid from an independent source for affecting the relative fluid pressures on opposite faces of said valve member respectively.

2. Valve control means comprising, a chamber, conduits for causing flow of liquid of predetermined character under pressure through said chamber, a valve member held in closed position by a soluble body positioned in said chamber, said soluble body being exposed to liquid in said casing, one face of said valve member being subject to the pressure exerted by said liquid, a conduit disposed to supply liquid of different character to the opposite face of said valve member, an outlet disposed to receive liquid when said member is in open position and means for actuating said valve member to open position.

3. In a valve, a casing, pipes for supplying liquid to said casing from independent sources, a chamber formed in said casing to receive a soluble body, an outlet communicating with said chamber, a valve member for controlling the flow of liquid to said outlet and adapted to be held in open position by a soluble body in said chamber, said soluble body being exposed to liquid in said casing, a second outlet communicating with said casing and a second valve member held in open position by said soluble body and arranged to control the flow of liquid to the second outlet from one of the supply pipes.

4. Valve control means comprising a casing, conduits for causing flow of liquid of predetermined character under pressure through said casing, a valve member held in closed position by a soluble body positioned in said casing, said soluble body being exposed to liquid in said casing, resilient means for actuating said valve member to open position, an outlet disposed to receive liquid when said member is in open position and a pipe disposed to supply to the casing a liquid of a different character at a pressure substantially equal to that of the liquid flowing through said first mentioned conduits for balancing fluid pressures on opposite faces of said valve member.

5. Valve control means comprising, a casing, a chamber formed in said casing to receive a soluble body, conduits for causing flow of liquid of predetermined character through said chamber, a valve member held in closed position by a soluble body positioned in said chamber, said soluble body being exposed to liquid in said casing, means for actuating said valve member to open position, a pipe disposed to supply liquid to said casing from an independent source at a pressure substantially equal to that of the liquid flowing through said conduits for balancing pressures on opposite faces of said valve member and a second valve member held in open position by said soluble body and arranged to control the flow of liquid to the casing from said pipe.

6. In a valve, a casing formed to receive a soluble body, a valve member adapted to be held in closed position by a soluble body in said casing, said soluble body being exposed to liquid in said casing, pipes communicating with said casing and arranged to supply liquid under pressure at opposite faces respectively of said valve member when said member is in closed position, outlets communicating with the casing at opposite faces respectively of said valve member and a second valve member held in open position by said soluble body and arranged to control the flow of liquid from one of the supply pipes to an outlet.

7. In a valve, a casing formed to receive a soluble body, a valve member adapted to be held in closed position by a soluble body in said casing, said soluble body being exposed to liquid in said casing, pipes communicating with said casing and arranged to supply liquid under pressure at opposite faces respectively of said valve member when said member is in closed position, a restriction in one of said pipes having a minute opening for the passage of liquid to the valve and outlets communicating with the casing at opposite faces respectively of said member.

8. In a valve, a casing formed to receive a soluble body, a valve member adapted to be held in closed position by a soluble body in said casing, said soluble body being exposed to liquid in said casing, pipes arranged to supply liquid under pressure at opposite faces respectively of the valve member when said member is in closed position, a restriction in one of said pipes having a minute opening for the passage of liquid to the casing and outlets communicating with the casing at opposite faces of said valve member, said minute opening being in continuous communication with one of said outlets.

LYNN G. LINDSAY.